(12) United States Patent
Kibe et al.

(10) Patent No.: US 9,316,882 B2
(45) Date of Patent: *Apr. 19, 2016

(54) LIQUID CRYSTAL PANEL

(71) Applicants: JNC CORPORATION, Tokyo (JP); JNC PETROCHEMICAL CORPORATION, Tokyo (JP)

(72) Inventors: Shigeru Kibe, Chiba (JP); Toshiki Asakura, Chiba (JP); Yasuhiro Kubo, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 14/220,144

(22) Filed: Mar. 20, 2014

(65) Prior Publication Data

US 2014/0313462 A1    Oct. 23, 2014

(30) Foreign Application Priority Data

Apr. 23, 2013 (JP) ................................. 2013-090323

(51) Int. Cl.
*G02F 1/1335* (2006.01)
*G02F 1/1337* (2006.01)
(Continued)

(52) U.S. Cl.
CPC .......... *G02F 1/137* (2013.01); *G02F 1/134309* (2013.01); *G02F 1/133512* (2013.01);
(Continued)

(58) Field of Classification Search
CPC ................... G02F 1/133512; G02F 1/133703; G02F 1/134336; G02F 1/134309; G02F 1/13439; G02F 1/13706; G02F 1/13712; G02F 2201/123; G02F 2201/1343; G02F 2201/134372; G02F 2201/137; G02F 1/133541; G02F 1/133707; G02F 2001/13706; G02F 2001/13712; C09K 19/02; C09K 19/0411; C09K 19/0414; C09K 19/3402; C09K 19/0403; C09K 2019/0414
See application file for complete search history.

(56) References Cited

U.S. PATENT DOCUMENTS 8,582,060 B2 * 11/2013 Ota .................... G02F 1/133512
349/110
8,629,962 B2 * 1/2014 Ota .................... G02F 1/133707
349/109
9,041,884 B2 * 5/2015 Ota .................... G02F 1/133512
349/110

(Continued)

FOREIGN PATENT DOCUMENTS

JP  2005-099455  4/2005
JP  2006-126419  5/2006
JP  2010-217821  9/2010

*Primary Examiner* — Shean C Wu
(74) *Attorney, Agent, or Firm* — Jianq Chyun IP Office

(57) ABSTRACT

To minimize color difference during white display, and secure high transmittance in liquid crystal panel driven by FFS mode or the like. Liquid crystal panel 10 has first substrate AR and second substrate CF oppositely arranged, and liquid crystal layer LC interposed between the first and the second substrates, wherein the first substrate has plural signal lines 18 and scanning lines 15 formed in matrix, upper electrode 24 having plural slit-shaped openings 25 divided by the scanning and signal lines, and formed for every sub-pixel, and lower electrode 21 formed with the upper electrode through insulating layer 23, the second substrate has light-shielding layer 28 superimposed with the signal and scanning lines in planar view, and color filter layer 29 formed for every sub-pixel, and the liquid crystal layer includes a mixture of at least one compound having negative dielectric anisotropy and at least one compound having positive dielectric anisotropy.

16 Claims, 3 Drawing Sheets

(51) Int. Cl.
*G02F 1/1343* (2006.01)
*G02F 1/137* (2006.01)
*C09K 19/02* (2006.01)
*C09K 19/34* (2006.01)

(52) U.S. Cl.
CPC ..... *G02F1/133514* (2013.01); *G02F 1/133707* (2013.01); *G02F 2001/13706* (2013.01); *G02F 2001/13712* (2013.01); *G02F 2001/134372* (2013.01); *G02F 2202/40* (2013.01)

(56) References Cited

U.S. PATENT DOCUMENTS

| | | |
|---|---|---|
| 2006/0092350 A1 | 5/2006 | Nishkoji et al. |
| 2007/0132927 A1* | 6/2007 | Tsuchiya .......... G02F 1/133707 349/117 |
| 2012/0008073 A1 | 1/2012 | Ota |
| 2013/0155357 A1* | 6/2013 | Ota .................. G02F 1/133512 349/110 |
| 2014/0313461 A1* | 10/2014 | Kibe ..................... G02F 1/137 349/106 |

\* cited by examiner

During no voltage application    During voltage application

LIQUID CRYSTAL PANEL

CROSS-REFERENCE TO RELATED APPLICATIONS

This application claims the priority benefit of Japan application serial no. 2013-090323, filed on Apr. 23, 2013. The entirety of the above-mentioned patent application is hereby incorporated by reference herein and made a part of this specification.

BACKGROUND OF THE INVENTION

1. Technical Field

The invention relates to a liquid crystal panel, particularly, to a liquid crystal panel suitable for a driving system according to a fringe field switching (FFS) mode.

2. Background Art

A liquid crystal panel has features of lighter weight, a flat-panel and lower electric power consumption in comparison with a cathode ray tube (CRT), and therefore is used for many electronics as a display use.

According to the liquid crystal panel, orientation of liquid crystal molecules aligned in a predetermined direction is changed by an electric field to change an amount of light transmitted through a liquid crystal layer, thereby displaying an image.

The liquid crystal panel includes a reflective type in which outside light enters the liquid crystal layer to be reflected on a reflector, and reflected light re-transmits the liquid crystal layer and is emitted, a transmissive type in which incident light from a backlight apparatus transmits the liquid crystal layer, and a transflective type having both properties.

Moreover, specific methods for applying the electric field to the liquid crystal layer of the liquid crystal panel include a longitudinal electric field system and a transverse electric field system.

In the liquid crystal panel according to the longitudinal electric field system, an electric field substantially in a longitudinal direction is applied to liquid crystal molecules by means of a pair of electrodes arranged by interposing the liquid crystal layer. As the liquid crystal panel according to the longitudinal electric field system, a liquid crystal panel having a mode such as a twisted nematic (TN) mode, a vertical alignment (VA) mode and a multi-domain vertical alignment (MVA) mode is known.

In the liquid crystal panel according to the transverse electric field system, a pair of electrodes is mutually insulated and arranged on an inner surface side of one of substrates of a pair of substrates arranged by interposing the liquid crystal layer, and an electric field substantially in a transverse direction is applied to the liquid crystal molecules. As the liquid crystal panel according to the transverse electric field system, a liquid crystal panel having an in-plane switching (IPS) mode in which a pair of electrodes does not overlap in a planar view, and a fringe field switching (FFS) mode in which a pair of electrodes overlaps in the planar view are known.

The liquid crystal panel according to the transverse electric field system allows obtaining of a wide viewing angle, and therefore has been increasingly used in recent years.

Moreover, the liquid crystal panel includes a monochrome display type and a color display type.

A color of one pixel of the color display type liquid crystal panel is determined by a color mixture of light transmitted through each sub-pixel individually equipped with color filters of three primary colors including red (R), green (G) and blue (B), for example. For example, if a voltage corresponding to 0 gradations to 255 gradations of 8 bits is applied to each sub-pixel of RGB, brightness of each sub-pixel is divided into 256 kinds, and many colors can be displayed with one pixel by a combination of brightness of each of the sub-pixels.

In the liquid crystal panel formed of such sub-pixels of RGB, a white display is obtained by lighting all of the sub-pixels of RGB.

However, a manufacture error or process variation during forming an insulating film, a resin layer or the like to be formed on a substrate of the liquid crystal panel causes disruption of chromaticity and brightness of RGB, resulting in a phenomenon in which, even when a voltage of identical graduation is applied to each sub-pixel of RGB, the light is not whitened but turns to be yellowish.

As a method for solving such a problem, Patent literature No. 1 below discloses an art in which, in a transflective liquid crystal display apparatus having a reflection display unit and a transmission display unit for every pixel, an area of a light-shielding region arranged in the reflection display unit of each pixel is adjusted so as to have transmission chromaticity substantially in coincidence with reflective chromaticity in a white display, thereby adjusting an opening ratio of the reflection display unit of at least one pixel of three pixels having different coloring.

As a method for constituting a color filter, a method for dispersing an organic pigment into resin such as acryl resin is mainly applied. In the above case, a scattering degree of incident light changes depending on a state of dispersion of pigment particles, and depolarization (degree of depolarization conditions) also changes.

Accordingly, when a difference of contrast in each color of RGB is large, an amount of light leaked from each pixel is significantly different, and therefore even when color adjustment is executed based on color characteristics during the white display, a phenomenon in which a color balance is disrupted during a black display arises.

As a method for solving such a problem, Patent literature No. 2 below discloses a method in which, in a substrate of a liquid crystal display apparatus in which a pixel or a pattern of a colored layer of red, green and blue is formed on an optically transparent support, relation between contrast of each colored layer and contrast of a polarizer is optimized, thereby having high contrast and minimizing a color difference between the white display and the black display.

Furthermore, Patent literature No. 3 below discloses that, in a liquid crystal display panel according to an FFS mode, a transmittance of a sub-pixel of at least one color among sub-pixels of a plurality of colors that form one pixel is further minimized, in comparison with a transmittance of sub-pixels of other colors, without depending on a light-shielding layer, and even when a relative positional deviation of a slit-shaped opening and a light-shielding layer arises, a white balance can be properly maintained.

CITATION LIST

Patent Literature

Patent literature No. 1: JP 2005-99455 A.
Patent literature No. 2: JP 2006-126419 A.
Patent literature No. 3: JP 2010-217821 A.

SUMMARY OF INVENTION

A liquid crystal panel according to an embodiment of the invention concerns a liquid crystal panel having a first substrate and a second substrate that are oppositely arranged, and a liquid crystal layer interposed between the first substrate and the second substrate, wherein the first substrate has a plurality of signal lines and scanning lines formed in a matrix, an upper electrode having a plurality of slit-shaped openings formed for every sub-pixel divided by the scanning lines and the signal lines, and a lower electrode formed with the upper electrode through an insulating layer, and the second substrate has a light-shielding layer superimposed with the signal lines and the scanning lines in a planar view, and a color filter layer formed for every sub-pixel described above, and the liquid crystal layer is formed of a mixture of at least one compound having a negative dielectric anisotropy and at least one compound having a positive dielectric anisotropy.

DESCRIPTION OF EMBODIMENTS

Technical Problem

However, in the liquid crystal display apparatus described in Patent literature No. 1 above, while a chromaticity difference between a reflection display unit and a transmission display unit is substantially made identical for every pixel, a driving mode is according to a longitudinal electric field system, and when any other driving mode such as a transverse electric field system is applied to the apparatus, the chromaticity difference may not be made identical. Moreover, an opening ratio of at least one sub-pixel of RGB is adjusted to be small by an increase in an area of a light-shielding region, and therefore the apparatus has a problem of a decrease in a transmittance.

In the liquid crystal display apparatus described in Patent literature No. 2 above, a hue change in a black display is mainly caused by an interaction between a polarizer and a colored layer formed in a color filter substrate also in any other driving mode, and thus while a color difference can be minimized even when any of a longitudinal electric field system and a transverse electric field system is applied to the apparatus, when the transverse electric field system is applied to the apparatus, optimum conditions of contrast of each colored layer and contrast of the polarizer significantly changes, and the color difference in a white display may not be minimized.

While the liquid crystal display panel described in Patent literature No. 3 above has an FFS mode, an area of one sub-pixel is minimized for white balance adjustment, and therefore the panel has a problem of a decreased transmittance.

In addition, Patent literature No. 2 described above discloses to the effect that a compound having a negative dielectric anisotropy is used as a liquid crystal layer interposed between both substrates of the liquid crystal display apparatus. However, Patent literature Nos. 1 and 3 refer to nothing as to use of a compound having any physical properties as the liquid crystal layer.

Figure 5:
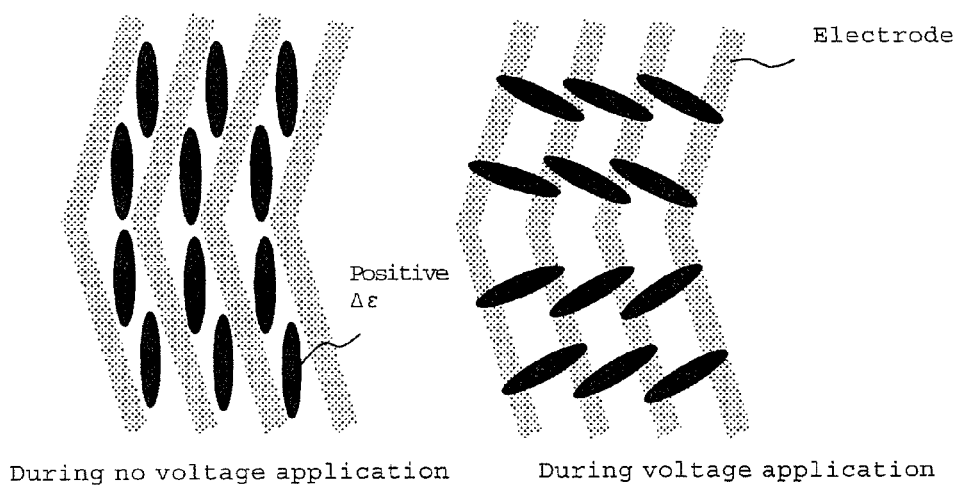
FIG. 5 shows a conceptual diagram of molecular arrangement in a liquid crystal layer in which a conventional compound has positive dielectric anisotropy (Δ∈).

FIG. 5 shows a conceptual diagram of movement of liquid crystal molecules when a liquid crystal panel having an FFS mode is driven by interposing a liquid crystal layer of only a compound having a positive dielectric anisotropy (Δ∈).

When voltage is not applied, the liquid crystal molecules are arranged substantially in parallel to an electrode, but when voltage is applied, the molecules change in a direction substantially perpendicular to the direction of the electrode.

When voltage is applied, a liquid crystal molecule group in an upper half and a liquid crystal molecule group in a lower half in FIG. 5 are spatially divided bordering on a refraction region of the electrode, and the liquid crystal molecule groups in the upper half and the lower half face to a different direction, and therefore small contribution of optical compensation for compensating optical distortion (birefringence) of the liquid crystal molecules has caused a problem of appearing yellow in the upper half and blue in the lower half.

The invention has been made in order to solve the problem, and an object of the invention is to minimize a color difference during the white display and secure a high transmittance in the liquid crystal panel driven by the FFS mode or the like.

Solution to Problem

Item 1. A liquid crystal panel according to an embodiment of the invention concerns a liquid crystal panel having a first substrate and a second substrate that are oppositely arranged, and a liquid crystal layer interposed between the first substrate and the second substrate, wherein the first substrate has a plurality of signal lines and scanning lines formed in a matrix, an upper electrode having a plurality of slit-shaped openings formed for every sub-pixel divided by the scanning lines and the signal lines, and a lower electrode formed with the upper electrode through an insulating layer, and the second substrate has a light-shielding layer superimposed with the signal lines and the scanning lines in a planar view, and a color filter layer formed for every sub-pixel described above, and the liquid crystal layer is formed of a mixture of at least one compound having a negative dielectric anisotropy and at least one compound having a positive dielectric anisotropy.

Item 2. The liquid crystal panel according to an embodiment of the invention concerns the liquid crystal panel according to item 1, wherein the upper electrode and the lower electrode overlap with each other in a planar view.

Item 3. The liquid crystal panel according to an embodiment of the invention concerns the liquid crystal panel according to item 1 or 2, wherein the compound having the negative dielectric anisotropy has a structure represented by formula (a), and a dielectric anisotropy in a range of −10 or more and −2 or less, and the compound having the positive dielectric anisotropy has a dielectric anisotropy in a range of 2 or more and 30 or less.

(a)

Item 4. The liquid crystal panel according to an embodiment of the invention concerns the liquid crystal panel according to item 3, wherein the number of rings of the compound having the negative dielectric anisotropy is 3 or more, and the compound having the positive dielectric anisotropy has a skeleton of any of 2-tetrahydropyran-1,4-yl, 3-tetrahydropyran-1,4-yl and 3,5-dioxane-1,4-yl.

Item 5. The liquid crystal panel according to an embodiment of the invention concerns the liquid crystal panel according to any one of items 1 to 4, wherein a ratio of the compound having the negative dielectric anisotropy is 5% by weight or more and 60% by weight or less.

Item 6. The liquid crystal panel according to an embodiment of the invention concerns the liquid crystal panel according to any one of items 1 to 5, wherein a color difference during a white display of the liquid crystal panel is 0.05 or less in a range: $0°<\theta\leq60°$, when an angle of the liquid crystal panel from a display horizontal plane is taken as $\theta$.

Item 7. The liquid crystal panel according to an embodiment of the invention concerns the liquid crystal panel according to any one of items 1 to 6, wherein the liquid crystal panel has a ratio of refractive index anisotropy to dielectric anisotropy in a range of 0.009 or more and 0.045 or less.

Advantageous Effects of Invention

According to the invention, in a liquid crystal panel driven by an FFS mode or the like, a color difference during a white display can be minimized, and simultaneously a high transmittance can be secured.

Hereinafter, an embodiment of a liquid crystal panel according to the invention is described with reference to a drawing.

Principle

Figure 1:
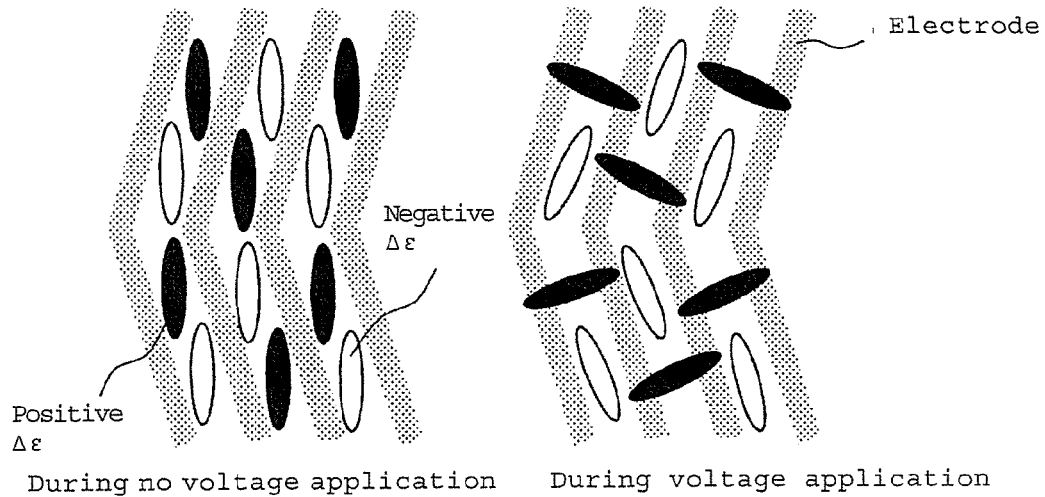
FIG. 1 shows a conceptual diagram of molecular arrangement in a liquid crystal layer in which a compound having a negative dielectric anisotropy (Δ∈) and a compound having a positive dielectric anisotropy (Δ∈) are mixed according to an embodiment of the invention.

FIG. 1 shows a conceptual diagram of movement of liquid crystal molecules when voltage is applied, in which a compound having a negative dielectric anisotropy ($\Delta\in$) (shown by an outline) and a compound having a positive dielectric anisotropy ($\Delta\in$) (shown by black) are mixed in a liquid crystal panel having an FFS mode to interpose a liquid crystal layer for optically uniformizing self-compensation.

When no voltage is applied, a liquid crystal component is arranged substantially in parallel to an electrode, in a manner similar to the conventional liquid crystal component in FIG. 5, but when voltage is applied, the compound having the positive dielectric anisotropy ($\Delta\in$) changes in a direction substantially perpendicular to the direction of the electrode, and the compound having the negative compound dielectric anisotropy ($\Delta\in$) changes in a direction substantially parallel to the direction of the electrode.

On the occasion, the compound having the negative compound dielectric anisotropy ($\Delta\in$) and the compound having the positive dielectric anisotropy ($\Delta\in$) become substantially perpendicular and are not spatially divided bordering on a refraction region of the electrode, and the compound having the negative compound dielectric anisotropy ($\Delta\in$) and the compound having the positive dielectric anisotropy ($\Delta\in$) are mixed in any part, and uniform optical compensation is performed as a whole.

The invention has been made based on a technical finding described above, and an object is to minimize the color difference during the white display, and simultaneously to secure a high transmittance in the liquid crystal panel driven by the FFS mode or the like.

Incidentally, a white display is allowed in a liquid crystal display apparatus, and chromaticity (u, v) represented by CIE 1960 colorimetric system is measured, and when chromaticity when seen from a perpendicular direction is taken as (u(⊥), v(⊥)), and chromaticity when seen from a direction inclined by an angle $\theta$ from a normal line direction on a display surface are taken as (u($\theta$), v($\theta$)), a chromaticity difference $\Delta$uv is represented by expression (1) below, and as a value thereof is smaller, the color comes closer to white in a range: $0°<\theta\leq60°$.

Expression: $\Delta uv = [\{u(\perp)-u(\theta)\}2+\{v(\perp)-v(\theta)\}2]1/2$ (1)

Moreover, a case where a dielectric constant of a major axis direction and a dielectric constant in a minor axis direction are different is referred to as having dielectric anisotropy, a case where the dielectric constant in the major axis direction is larger is referred to as "positive dielectric anisotropy," and a case where the dielectric constant in the minor axis direction is larger is referred to as "negative dielectric anisotropy."

Bias of an electric charge is caused by spin polarization of electron within molecular structure, and therefore a difference in a sign of the dielectric anisotropy depends on structure of liquid crystal molecules.

Relation between anisotropy of dielectric constant and a refractive index (n) is represented by expression (2).

Expression: $\in^{\infty} = n^2$ (2)

A term $\in^{\infty}$ represents a dielectric constant when frequency is infinite, more specifically, when the frequency is high, and therefore can be regarded as a dielectric constant resulting from electron polarization, and thus equals to a square of a refractive index (n).

Furthermore, Oh-e, Kondo, et al. report that, in Preprints of Symposium on Liquid Crystals, 22 (pp. 307 to 308, 9.30, 1996, Japanese Liquid Crystal Society), when a cell gap between electrodes is taken as 1, a cell gap is taken as d, an elastic constant of twist is taken as K2, and dielectric constant of vacuum is taken as $\in0$, a relationship: threshold voltage $Vth = (\pi l/d)\cdot(K2/\in0|\Delta\in|)1/2$ exists with regard to switching of a liquid crystal according to the transverse electric field system.

Since a term: $d\cdot\Delta n$ is a fixed constant, refractive index anisotropy ($\Delta n$) and dielectric anisotropy ($\Delta\in$) are known to have close relation, and a value of a ratio of refractive index anisotropy ($\Delta n$) to dielectric anisotropy ($\Delta\in$) is determined according to a liquid crystal material to be applied.

According to the invention, an effect is produced by the FFS mode, and also an effect similar to the effect by the FFS mode is produced in other driving modes (an IPS, VA, PSA, PSBP or OCB mode or the like).

More specifically, the reason is that the hue change in the white display, which is a hitherto-known problem, mainly results from an interaction between a polarizer and a colored layer formed on a color filter substrate also in other driving modes, and can be solved according to the method of the invention in which optically uniform self-compensation in the liquid crystal layer is allowed by mixing the compound having the negative dielectric anisotropy and the compound having the positive dielectric anisotropy.

Constitution of a Liquid Crystal Panel

Figure 2:
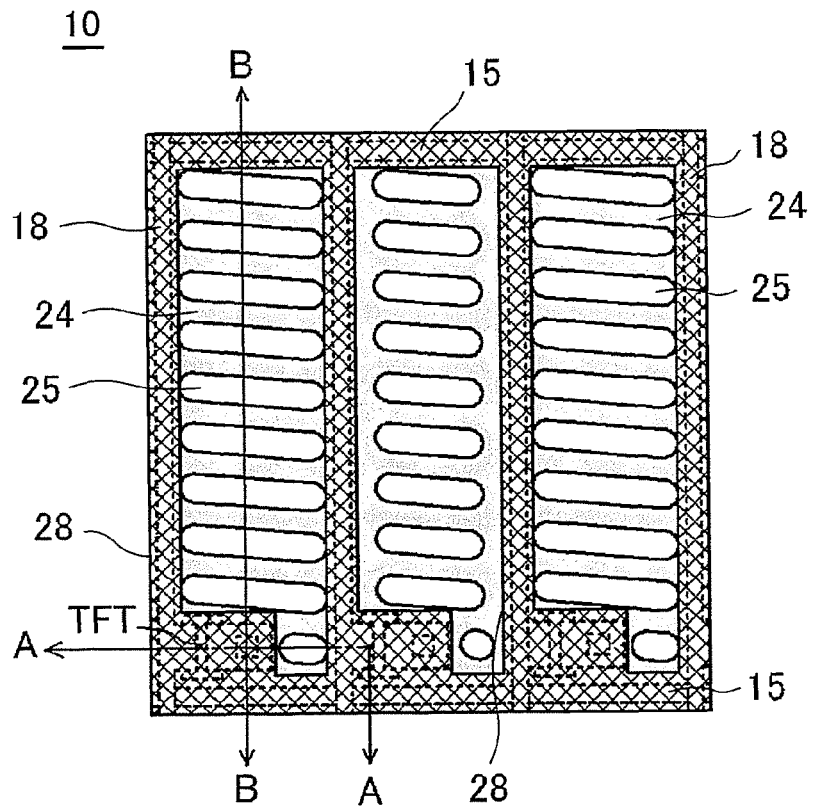
FIG. 2 shows a plan view of a liquid crystal panel according to an embodiment of the invention.
Figure 3:
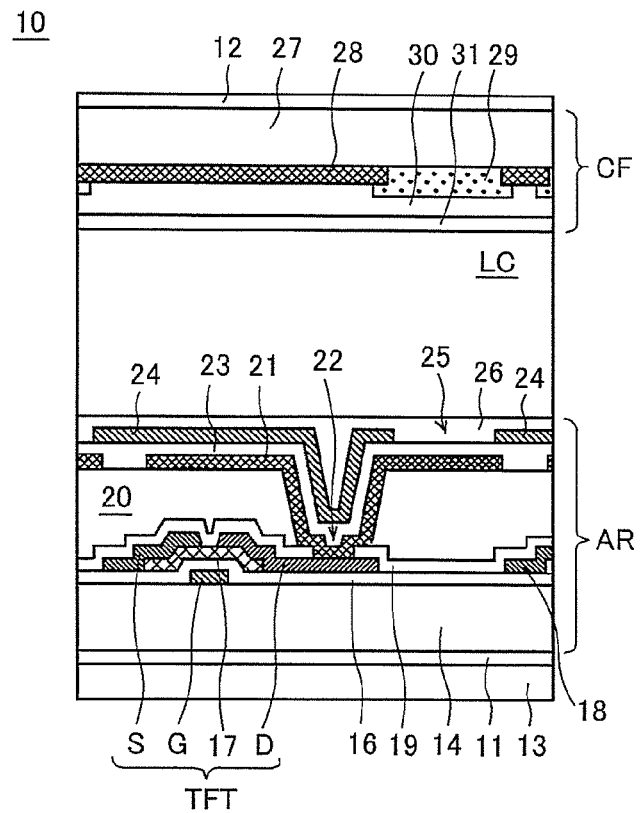
FIG. 3 shows an A-A cross-sectional view of a liquid crystal panel in FIG. 2.
Figure 4:
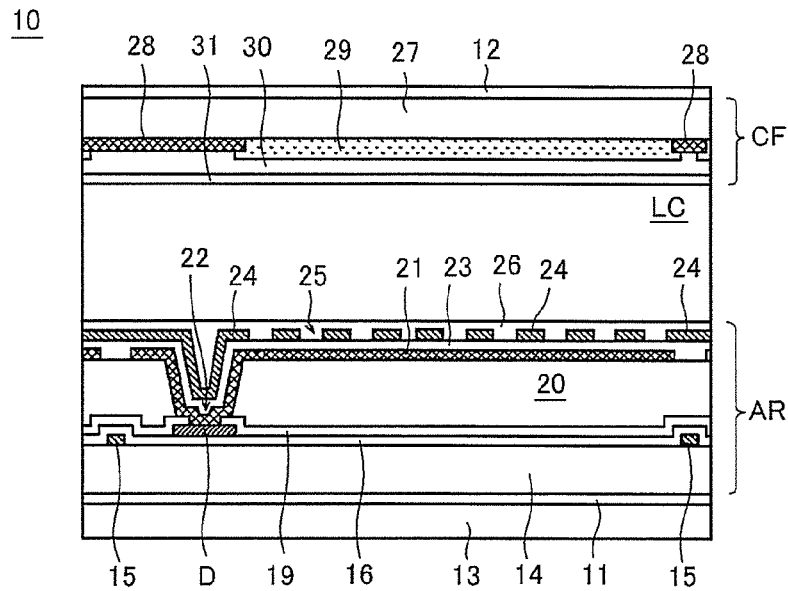
FIG. 4 shows a B-B cross-sectional view of a liquid crystal panel in FIG. 2.

FIG. 2 shows a plan view of a liquid crystal panel according to an embodiment of the invention, FIG. 3 shows an A-A cross-sectional view of the liquid crystal panel in FIG. 2, and FIG. 4 shows a B-B cross-sectional view of the liquid crystal panel in FIG. 2.

Liquid crystal panel 10 of the present embodiment is driven by the FFS mode according to the transverse electric field system.

An essential part of liquid crystal panel 10 is explained using FIG. 2 to FIG. 4.

Liquid crystal panel 10 has a constitution in which liquid crystal layer LC is interposed between array substrate AR and color filter substrate CF.

Array substrate AR is formed of transparent insulating glass, quartz, a plastic or the like, and has first transparent substrate 14 as a base substance.

On first transparent substrate 14, scanning line 15 formed of a metal such as aluminum and molybdenum is formed on a side facing with liquid crystal LC.

Moreover, transparent gate insulating film 16 formed of silicon nitride, silicon oxide or the like is laminated so as to cover scanning line 15 and gate electrode G. Then, on gate insulating film 16 overlapping with gate electrode G in a planar view, semiconductor layer 17 formed of amorphous silicon, polycrystalline silicon or the like is formed. On gate insulating film 16, a plurality of signal lines 18 formed of a metal such as aluminum and molybdenum are formed.

Furthermore, signal line 18 and drain electrode simultaneously formed with a material identical with source electrode S are arranged on gate insulating film 16, and drain electrode D is closely arranged with source electrode S, and partially in contact with semiconductor layer 17.

Thin film transistor TFT that serves as a switching device is constituted by gate electrode G, gate insulating film 16, semiconductor layer 17, source electrode S and drain electrode D.

Moreover, transparent passivation film 19 formed of silicon nitride, silicon oxide or the like is laminated so as to cover an exposed part of signal line 18, TFT and gate insulating film 16.

Then, flattened resin layer 20 formed of a transparent resin material such as a photoresist is laminated so as to cover passivation film 19.

Lower electrode 21 formed of a transparent conductive material such as indium tin oxide (ITO) or indium zinc oxide (IZO) is formed so as to cover flattened resin layer 20.

Moreover, contact hall 22 reaching drain electrode D through flattened resin layer 20 and passivation film 19 is formed, and lower electrode 21 and drain electrode D are electrically connected through the contact hall 22. Therefore, lower electrode 21 operates as a pixel electrode herein.

Transparent inter-electrode insulating film 23 formed of silicon nitride, silicon oxide or the like is laminated so as to cover lower electrode 21.

Then, upper electrode 24 formed of a transparent conductive material such as ITO and IZO is formed so as to cover inter-electrode insulating film 23.

On each sub-pixel divided by scanning line 15 and signal line 18, upper electrode 24 is integrally formed and operates as a common electrode.

As shown in FIG. 2 to FIG. 4, a plurality of slit-shaped openings 25 are formed on upper electrode 24. Slit-shaped openings 25 are oval, and inclined in a longitudinal direction, for example, by five degrees downward to the right relative to an extending direction of scanning line 15.

Alignment film 26 formed of polyimide is laminated by covering upper electrode 24.

Liquid crystal direction alignment treatment (rubbing treatment) is applied to alignment film 26 in parallel to an extending direction of signal line 18, and alignment of liquid crystal molecules in liquid crystal layer LC changes by an electric field between upper electrode 24 and lower electrode 21 in a position corresponding to slit-shaped opening 25.

Color filter substrate CF has, as a base substance, second transparent substrate 27 formed of transparent insulating glass, quartz, plastic or the like.

On second transparent substrate 27, as shown in FIG. 3 and FIG. 4, light-shielding layer 28 and color filter layer 29 through which light (R, G, B, for example) having a color different for every sub-pixel transmits is formed.

Overcoat layer 30 formed of a transparent resin material such as a photoresist is laminated so as to cover light-shielding layer 28 and color filter layer 29.

Overcoat layer 30 is arranged in order to flatten a level difference by color filter layer 29 having a different color, and simultaneously to allow no entry of an impurity flowing out from light-shielding layer 28 or color filter layer 29 into liquid crystal layer LC.

Alignment film 31 formed of polyimide or the like is formed so as to cover overcoat layer 30, and liquid crystal direction alignment treatment in a direction reverse to the direction of liquid crystal of alignment film 26 is applied to alignment film 31.

The thus formed array substrate AR and color filter substrate CF are opposed with each other, a sealing material (not shown) is arranged in a circumference of both substrates to bond both substrates, and a liquid crystal is filled between both substrates.

In addition, a spacer (not shown) for holding liquid crystal layer LC at predetermined thickness is formed on color filter substrate CF.

First polarizer 11 is arranged in an outside of array substrate AR, and second polarizer 12 is arranged in an outside of color filter substrate CF, respectively.

In the constitution described above, when TFT is turned into an ON state and voltage is applied between lower electrode 21 and upper electrode 24, an electric field is generated between both electrodes 21 and 24, and alignment of liquid crystal molecules in liquid crystal layer LC changes.

Thus, a light transmittance of liquid crystal layer LC changes to allow displaying of an image. Then, auxiliary capacity is formed by lower electrode 21, upper electrode 24 and inter-electrode insulating film 23, and when TFT is turned into OFF, the electric field between both electrodes 21 and 24 is held for a predetermined period of time.

Liquid Crystal Material

Hereinafter, a compound having a negative dielectric anisotropy, a compound having a positive liquid crystal compound or the like is described in full detail. The compound having the negative dielectric anisotropy and the compound having the positive liquid crystal compound include at least one compound, respectively, and preferably, a mixture of at least two compounds.

General examples of the compound having the negative dielectric anisotropy include compounds as represented by compounds (1) to (5), and dielectric anisotropy of each compound is approximately −10 or more and approximately −2 or less, and preferably, approximately −7 or more and approximately −3 or less.

A ratio of mixing a liquid crystal component having a negative dielectric anisotropy is preferably approximately 5% by weight or more for developing self-optical compensation, and preferably approximately 60% by weight or less for suppressing a rise of driving voltage, and further preferably, approximately 10% by weight or more and approximately 50% by weight or less, based on the total weight of compounds in the liquid crystal layer.

In the liquid crystal panel according to the FFS mode, when a compound is used for the liquid crystal layer formed of the mixture of the compound having the negative dielectric anisotropy ($\Delta\in$) and the compound having the positive dielectric anisotropy to allow optically uniform self-compensation, an absolute value of $\Delta\in$ is preferably moderately larger.

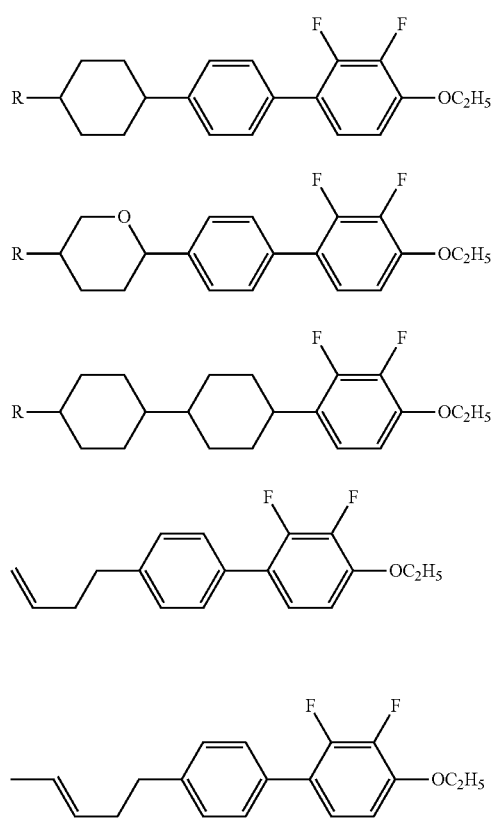

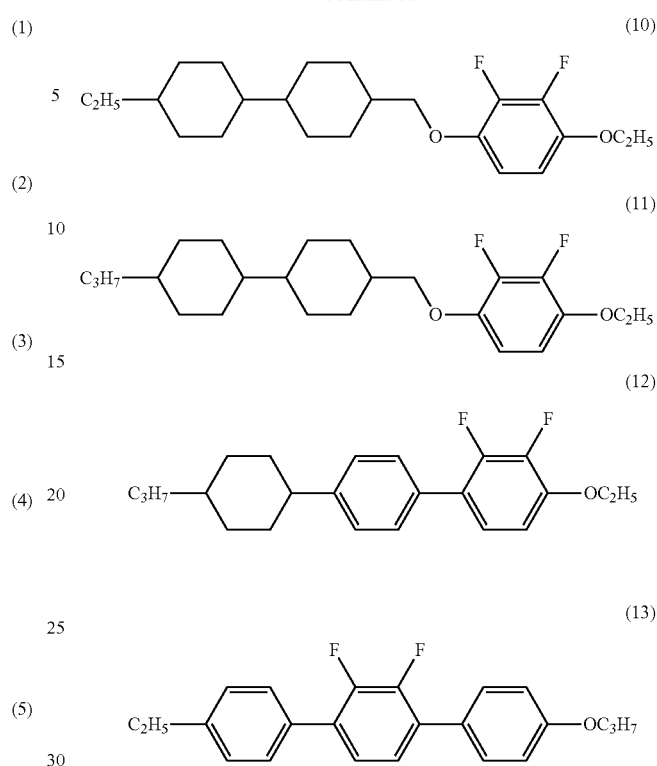

wherein, R is an alkyl group having 2 to 7 carbons or an alkenyl group having 2 to 7 carbons.

Moreover, compounds represented by (6) to (13) below are preferred.

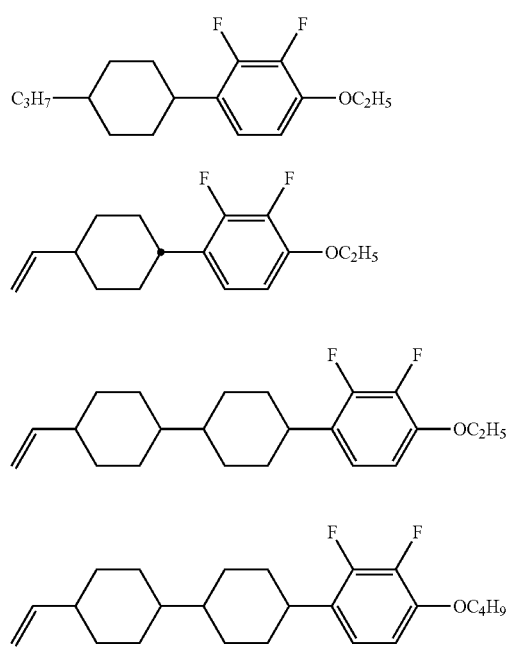

Next, general examples of the compound having the positive dielectric anisotropy include compounds as represented by chemical formulas (14) to (21) below, and dielectric anisotropy of each compound is approximately 2 or more and approximately 30 or less. Moreover, the dielectric anisotropy can be classified into a middle degree including approximately 2 to approximately 15, and a high degree exceeding approximately 15 and approximately 30 or less.

In the liquid crystal panel according to the FFS mode, when a compound is used for the liquid crystal layer formed of the mixture of the compound having the negative dielectric anisotropy ($\Delta\epsilon$) and the compound having the positive dielectric anisotropy to allow optically uniform self-compensation, a ratio of mixing the compound having the high degree of dielectric anisotropy is preferably higher in comparison with the compound having the middle degree of dielectric anisotropy.

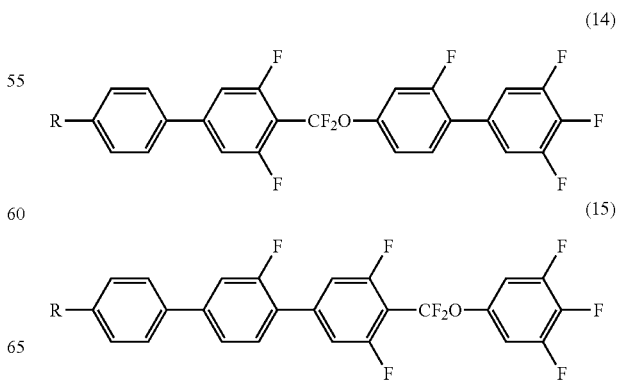

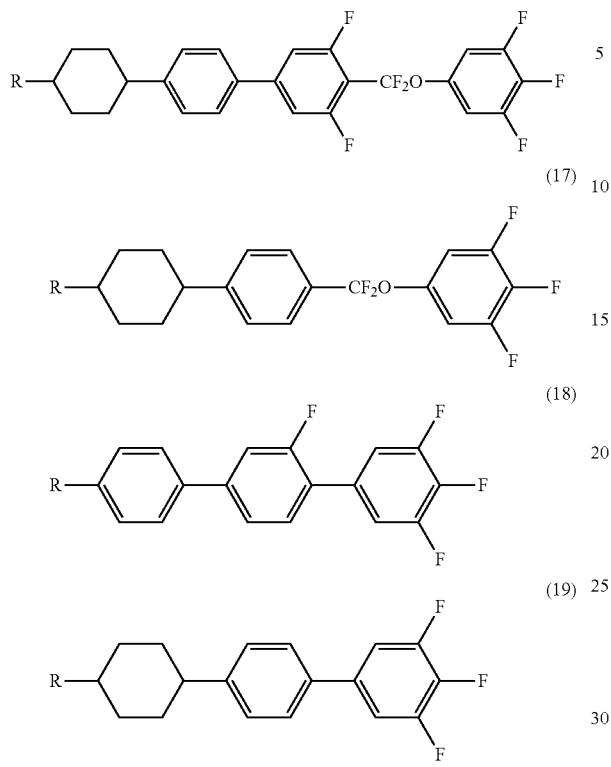

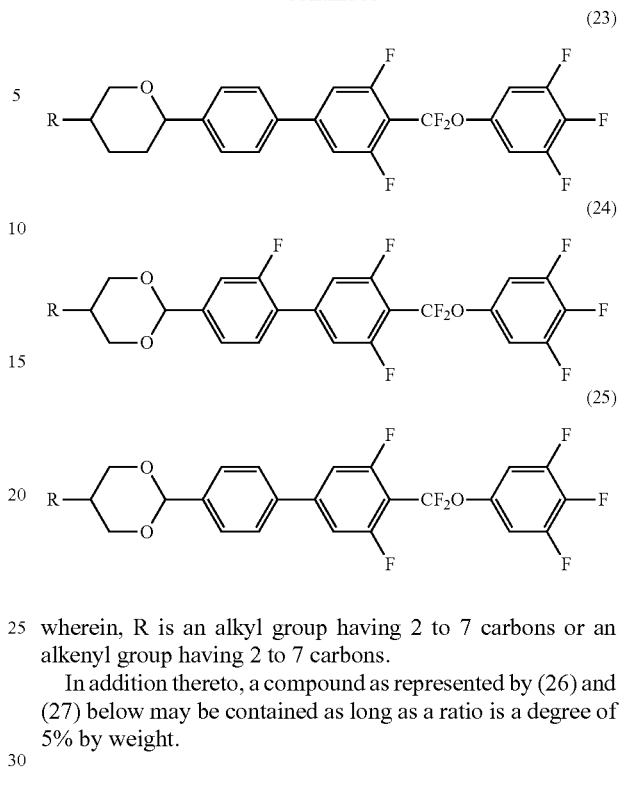

wherein, R is an alkyl group having 2 to 7 carbons or an alkenyl group having 2 to 7 carbons.

Above all, a compound having any one of skeletons of 2-tetrahydropyran-1,4-yl, 3-tetrahydropyran-1,4-yl and 3,5-dioxane-1,4-yl has a middle degree of refractive index anisotropy (Δn), and simultaneously has the high degree of dielectric anisotropy (Δ∈) (exceeding approximately 15 and approximately 30 or less), and thus has excellent capability of adjusting a ratio of refractive index anisotropy (Δn) to dielectric anisotropy (Δ∈).

Preferred examples of such compounds include compounds as represented by (22) to (25) below.

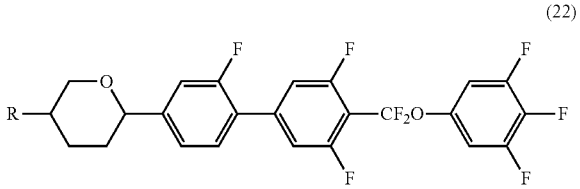

wherein, R is an alkyl group having 2 to 7 carbons or an alkenyl group having 2 to 7 carbons.

In addition thereto, a compound as represented by (26) and (27) below may be contained as long as a ratio is a degree of 5% by weight.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Color filter substrate CF was prepared by using, on a glass substrate, a black pigment dispersion resist, forming a black matrix pattern, and then repeatedly performing, in the order of red, green and black, coating of a pigment dispersion type resist according to a spin coating method, pre-baking, exposure, etching and post-baking, and further forming an ITO film having a thickness of approximately 1,500 Å by a sputtering method, and a photo spacer having a height of approximately 3.5 micrometers by a positive resist, and forming a polyimide alignment film having a thickness of approximately 1,000 Å.

Array substrate AR was prepared by laminating and forming, on TFT formed on a glass substrate, a passivation film, a flattened resin layer and also a lower electrode, an insulating film and an upper electrode by an ordinary method, and forming a polyimide alignment film having a thickness of approximately 1,000 Å.

Liquid crystals A to E were injected between color filter substrate CF and array substrate AR, and liquid crystal cells A to E were prepared.

In liquid crystals A to D, with regard to a compound having a negative dielectric anisotropy, at least one compound can be appropriately selected from the compounds (1) to (13), and specific compounds are as presented in Table 1. With regard to a compound having a positive dielectric anisotropy, at least one compound can be appropriately selected from the compounds (14) to (25), and specifically, JC-5149XX (NI: 91.6° C., $\Delta n$: 0.105, $\Delta\epsilon$: 14.0) made by JNC Corporation was used.

In liquid crystal B, the compound (26) was mixed and prepared as any other compound, in liquid crystal D, the compound (27) was mixed and prepared as any other compound, and liquid crystal E was prepared using only a compound having a positive dielectric anisotropy.

Table 1 presents compounds and compositions (% was expressed in terms of weight %) of liquid crystals A to E, and characteristics of liquid crystal cells A to E.

crystal molecules was measured. A voltage of 0.5 V was applied to the cell, and a dielectric constant ($\epsilon\perp$) in the minor axis direction of the liquid crystal molecules was measured. A value of dielectric anisotropy was calculated from an equation: $\Delta\epsilon = \epsilon_\| - \epsilon_\perp$.

With regard to a color difference during a white display, in a case where a ratio of $\Delta n/\Delta\epsilon$ is 0.009 or more, generation of an afterimage becomes hard in the panel, and therefore the color difference is minimized, and thus such a case is preferred, and in a case where the ratio is 0.045 or less, driving voltage is minimized, and therefore such a case is preferred.

Maximum value of a light transmittance (Tmax; measured at 25° C.): A transmittance at which a transmittance-driving voltage curve becomes substantially constant after raising driving voltage from a threshold was measured as Tmax.

Next, a polarizer and a phase difference plate ($\Delta n \cdot d = (nx-ny) \cdot d = 50$ nm), Rth=(nx-nz), d=120 nm) obtained by performing stretching treatment of a norbornene-based film were bonded through an acrylic pressure-sensitive adhesive such that an absorption axis of the polarizer and a phase lagging axis (nx direction) of the phase difference plate were orthogonally crossed with each other, and thus a composite optical film was obtained.

A phase difference value was measured using KOBRA-21ADH made by Oji Scientific Instruments.

Then, on both sides of liquid crystal cells A to E, the composite optical films described above were bonded such that polarizer absorption axes were orthogonally crossed with

TABLE 1

| Compound | Liquid crystal A | | Liquid crystal B | | Liquid crystal C | | Liquid crystal D | | Liquid crystal E | |
|---|---|---|---|---|---|---|---|---|---|---|
| Ratio of compound having negative $\Delta\epsilon$ | | | | | | | | | | |
| Break-down of compound having negative $\Delta\epsilon$ | Compound (6) Compound (7) Compound (8) Compound (9) Compound (10) Compound (11) | 10% 10% 10% 10% 10% 10% | Compound (6) Compound (7) Compound (8) Compound (9) Compound (12) | 10% 10% 10% 10% 5% | Compound (4) Compound (12) Compound (13) | 5% 15% 10% | Compound (13) | 5% | | |
| Ratio of compound having positive $\Delta\epsilon$ | JC-5194XX | 40% | JC-5194XX | 50% | JC-5194XX | 70% | JC-5194XX | 90% | JC-5194XX | 100% |
| Ratio of any other compound | | 0% | Compound (26) | 5% | | 0% | Compound (27) | 5% | | 0% |
| Characteristics of liquid crystal cell | Liquid crystal cell A | | Liquid crystal cell B | | Liquid crystal cell C | | Liquid crystal cell D | | Liquid crystal cell E | |
| $\Delta n$ | 0.101 | | 0.101 | | 0.136 | | 0.119 | | 0.105 | |
| $\Delta\epsilon$ | 2.4 | | 5.5 | | 8.7 | | 12.5 | | 14.0 | |
| $\Delta n/\Delta\epsilon$ | 0.042 | | 0.018 | | 0.016 | | 0.009 | | 0.0075 | |
| Tmax | 0.266 | | 0.263 | | 0.256 | | 0.245 | | 0.234 | |

Characteristics of liquid crystal cells A to E were measured according to the methods described below.

Optical anisotropy ($\Delta n$; measured at 25° C.): Measurement was carried out using an Abbe refractometer using light having a wavelength of 589 nm.

Dielectric anisotropy ($\Delta\epsilon$; measured at 25° C.): A sample was put in a TN device in which a distance (cell gap) between two glass substrates was 9 micrometers and a twist angle was 80 degrees. A voltage of 10 V was applied to the cell, and a dielectric constant ($\epsilon_\|$) in the major axis direction of liquid each other, and thus liquid crystal panels 1 to 5 were prepared. In addition, color temperature in a white display in each panel was adjusted to approximately 10,000 K by a backlight.

Each liquid crystal panel was driven by an FFS mode, and under a state in which voltage was applied, a color difference and a transmittance between a front white display and a white display on a position inclined by 60 degrees on liquid crystal panels 1 to 5 were measured using Luminance Colorimeter BM-5A made by Topcon Corporation. The results are presented in Table 2.

TABLE 2

| Panel | Color difference | Transmittance |
|---|---|---|
| 1 | 0.0149 | 8.0% |
| 2 | 0.0138 | 7.9% |
| 3 | 0.0424 | 7.7% |
| 4 | 0.0277 | 7.4% |
| 5 | 0.0521 | 7.0% |

Table 2 presents that, with regard to the color difference during the white display, the color difference is as small as 0.05 or less in panels 1 to 4 prepared by mixing a compound having structure represented by formula (a) and having negative $\Delta\varepsilon$ in a range of 5% by weight to 60% by weight and a compound having positive $\Delta\varepsilon$, and the color difference was satisfactory in visual evaluation.

However, in panel 5 prepared without including the compound represented by formula (a) and having negative $\Delta\varepsilon$, a color difference exceeded 0.05 and was strongly yellowish in visual evaluation. Moreover, a transmittance was 7.4% or more in panels 1 to 4, and a predetermined level of brightness was allowed to be secured, but in panel 5, a transmittance was as low as 7.0%, and brightness was low.

(a)

As described above, according to the present embodiment, in the liquid crystal panel according to the FFS mode, the liquid crystal layer was formed of the mixture of the compound having the negative dielectric anisotropy and the compound having the positive dielectric anisotropy to allow optically uniform self-compensation, and therefore the color difference during the white display was allowed to be minimized, and a high transmittance was allowed to secure.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

REFERENCE SIGNS LIST

10 . . . liquid crystal panel, 11 . . . first polarizer, 12 . . . second polarizer, 13 . . . backlight apparatus, 14 . . . first transparent substrate, 15 . . . scanning line, 16 . . . gate insulating film, 17 . . . semiconductor layer, 18 . . . signal line, 19 . . . passivation film, 20 . . . flattened resin layer, 21 . . . lower electrode, 22 . . . contact hole, 23 . . . inter-electrode insulating film (insulating layer), 24 . . . upper electrode, 25 . . . slit-shaped opening, 26 . . . alignment film, 27 . . . second transparent substrate, 28 . . . light-shielding layer, 29 . . . color filter layer, 30 . . . overcoat layer, 31 . . . alignment film, LC . . . liquid crystal layer, AR . . . array substrate (first substrate), CF . . . color filter substrate (second substrate), S . . . source electrode, G . . . gate electrode, D . . . drain electrode.

What is claimed is:

1. A liquid crystal panel having a first substrate and a second substrate that are oppositely arranged, and a liquid crystal layer interposed between the first substrate and the second substrate, wherein the first substrate has a plurality of signal lines and scanning lines formed in a matrix, an upper electrode having a plurality of slit-shaped openings formed for every sub-pixel divided by the scanning lines and the signal lines, and a lower electrode formed with the upper electrode through an insulating layer, the second substrate has a light-shielding layer superimposed with the signal lines and the scanning lines in a planar view, and a color filter layer formed for every sub-pixel described above, and the liquid crystal layer is formed of a mixture of at least one compound having a negative dielectric anisotropy and at least one compound having a positive dielectric anisotropy.

2. The liquid crystal panel according to claim 1, wherein the upper electrode and the lower electrode overlaps with each other in a planar view.

3. The liquid crystal panel according to claim 1, wherein the compound having the negative dielectric anisotropy has a structure represented by formula (a), and a dielectric anisotropy in a range of −10 or more and −2 or less, and the compound having the positive dielectric anisotropy has a dielectric anisotropy in a range of 2 or more and 30 or less:

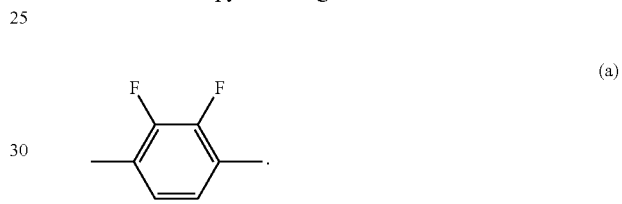

(a)

4. The liquid crystal panel according to claim 3, wherein the number of rings of the compound having the negative dielectric anisotropy is 3 or more, and the compound having the positive dielectric anisotropy has a skeleton of any of 2-tetrahydropyran-1,4-yl, 3-tetrahydropyran-1,4-yl and 3,5-dioxane-1,4-yl.

5. The liquid crystal panel according to claim 3, wherein a ratio of the compound having the negative dielectric anisotropy is in a range of 5% by weight or more and 60% by weight or less.

6. The liquid crystal panel according to claim 4, wherein a ratio of the compound having the negative dielectric anisotropy is in a range of 5% by weight or more and 60% by weight or less.

7. The liquid crystal panel according to claim 1, wherein a color difference during a white display of the liquid crystal panel is 0.05 or less in a range: $0°<\theta\leq60°$, when an angle of the liquid crystal panel from a display horizontal plane is taken as $\theta$.

8. The liquid crystal panel according to claim 2, wherein a color difference during a white display of the liquid crystal panel is 0.05 or less in a range: $0°<\theta\leq60°$, when an angle of the liquid crystal panel from a display horizontal plane is taken as $\theta$.

9. The liquid crystal panel according to claim 3, wherein a color difference during a white display of the liquid crystal panel is 0.05 or less in a range: $0°<\theta\leq60°$, when an angle of the liquid crystal panel from a display horizontal plane is taken as $\theta$.

10. The liquid crystal panel according to claim 4, wherein a color difference during a white display of the liquid crystal panel is 0.05 or less in a range: $0°<\theta\leq60°$, when an angle of the liquid crystal panel from a display horizontal plane is taken as $\theta$.

11. The liquid crystal panel according to claim 5, wherein a color difference during a white display of the liquid crystal panel is 0.05 or less in a range: $0°<\theta\leq60°$, when an angle of the liquid crystal panel from a display horizontal plane is taken as $\theta$.

12. The liquid crystal panel according to claim 6, wherein a color difference during a white display of the liquid crystal panel is 0.05 or less in a range: $0°<\theta\leq60°$, when an angle of the liquid crystal panel from a display horizontal plane is taken as $\theta$.

13. The liquid crystal panel according to claim 5, wherein the liquid crystal panel has a ratio of refractive index anisotropy to dielectric anisotropy in a range of 0.009 or more and 0.045 or less.

14. The liquid crystal panel according to claim 7, wherein the liquid crystal panel has a ratio of refractive index anisotropy to dielectric anisotropy in a range of 0.009 or more and 0.045 or less.

15. The liquid crystal panel according to claim 9, wherein the liquid crystal panel has a ratio of refractive index anisotropy to dielectric anisotropy in a range of 0.009 or more and 0.045 or less.

16. The liquid crystal panel according to claim 11, wherein the liquid crystal panel has a ratio of refractive index anisotropy to dielectric anisotropy in a range of 0.009 or more and 0.045 or less.

\* \* \* \* \*